(12) United States Patent
Wulf et al.

(10) Patent No.: US 7,631,939 B2
(45) Date of Patent: Dec. 15, 2009

(54) VEHICLE SEAT, IN PARTICULAR A MOTOR VEHICLE SEAT

(75) Inventors: Sebastian Wulf, Wiernsheim (DE); Helmut Wiedmann, Erbach (DE)

(73) Assignee: RECARO GmbH & Co. KG, Kirchheim unter Teck (DE)

( * ) Notice: Subject to any disclaimer, the term of this patent is extended or adjusted under 35 U.S.C. 154(b) by 413 days.

(21) Appl. No.: 11/714,602

(22) Filed: Mar. 6, 2007

(65) Prior Publication Data

US 2007/0210635 A1 Sep. 13, 2007

(30) Foreign Application Priority Data

Mar. 7, 2006 (DE) ........................ 10 2006 010 421

(51) Int. Cl.
 A47C 1/00 (2006.01)
 B60N 2/02 (2006.01)
(52) U.S. Cl. ...................... 297/344.13; 297/344.17; 297/330; 297/361.1
(58) Field of Classification Search ................. 297/322, 297/325, 329, 330, 452.4, 361.1, 344.13, 297/344.15, 344.17
See application file for complete search history.

(56) References Cited

U.S. PATENT DOCUMENTS

| | | | |
|---|---|---|---|
| 4,509,796 A | | 4/1985 | Takagi |
| 4,767,157 A | * | 8/1988 | Kazaoka et al. ............ 297/322 |
| 5,358,308 A | * | 10/1994 | Judic et al. ................. 297/316 |
| 5,547,259 A | * | 8/1996 | Fredrick ................. 297/452.18 |
| 5,979,985 A | * | 11/1999 | Bauer et al. ................. 297/340 |
| 7,240,965 B2 | * | 7/2007 | Messerschmidt et al. ............. 297/344.15 |
| 2003/0001419 A1 | | 1/2003 | Roth et al. |
| 2004/0245830 A1 | | 12/2004 | Scheck et al. |

FOREIGN PATENT DOCUMENTS

| | | |
|---|---|---|
| DE | 42 37 348 A1 | 5/1993 |
| DE | 44 03 506 A1 | 8/1995 |
| DE | 44 05 075 A1 | 1/1996 |
| DE | 297 00 293 U1 | 2/1997 |
| DE | 100 44 725 A1 | 3/2002 |
| DE | 101 30 813 A1 | 2/2003 |
| EP | 0 455 086 A2 | 11/1991 |
| FR | 2 433 433 A1 | 3/1980 |
| WO | WO 03/024739 A1 | 3/2003 |

* cited by examiner

*Primary Examiner*—Milton Nelson, Jr.
(74) *Attorney, Agent, or Firm*—Womble Carlyle Sandridge & Rice, PLLC

(57) ABSTRACT

A vehicle seat has a base, a front pivotable link indirectly pivotably attached to the base, a rear pivotable link pivotably attached to the base, a seat frame, a seat cushion supported on the seat frame, and a backrest that is mounted on the seat frame by way of a fitting defining a backrest pivot axis. The seat frame is pivotably attached to the front pivotable link. The seat frame is pivotably attached to the rear pivotable link in a manner that defines a pivot axis (41) about which there can be relative pivoting between the rear pivotable link and the seat frame. The height and/or inclination of the seat cushion is adjustable relative to the base by moving the pivotable links. The pivot axis (41) is positioned rearwardly of the backrest pivot axis in at least one position of adjustment of the seat cushion and/or of the backrest.

20 Claims, 3 Drawing Sheets

VEHICLE SEAT, IN PARTICULAR A MOTOR VEHICLE SEAT

RELATED APPLICATION

The present application claims priority to DE 10 2006 010 421.8, which was filed Mar. 7, 2006. The entire disclosure of DE 10 2006 010 421.8 is incorporated herein by reference.

BACKGROUND OF THE INVENTION

The present invention relates to a vehicle seat, in particular a motor vehicle seat, having a base that extends in the direction of travel and thereby defines a longitudinal seat direction, at least one front pivotable link indirectly pivotably attached to the base, at least one rear pivotable link pivotably attached to the base, a seat frame pivotably attached to both the front pivotable link and the rear pivotable link, a seat cushion supported on the seat frame, and a backrest that is mounted on the seat frame by way of a fitting defining a backrest pivot axis, wherein the height and/or inclination of the seat cushion is adjustable relative to the base by moving the pivotable links.

In known vehicle seats of the type described above, the pivotable links together with the base and the seat frame define a four-bar linkage. By moving this four-bar linkage, it is possible to adjust the height of the seat frame and thus of the seat cushion relative to the base. The selected geometries limit the downward adjustability, i.e. they limit the lowest position of the hip point of an occupant of the seat. Compared with vehicle seats in which the height of the seat cushion cannot be adjusted, this lowest position is still quite high.

BRIEF SUMMARY OF SOME ASPECTS OF THE INVENTION

An aspect of the present invention is the provision of improvements to a vehicle seat of the type discussed above. In accordance with one aspect of the present invention, a vehicle seat, in particular a motor vehicle seat, has a base that extends in the direction of travel and thereby defines a longitudinal seat direction, at least one front pivotable link indirectly pivotably attached to the base, at least one rear pivotable link pivotably attached to the base, a seat frame, a seat cushion supported on the seat frame, and a backrest that is mounted on the seat frame by way of a fitting defining a backrest pivot axis. The seat frame is pivotably attached to the front pivotable link. The seat frame is pivotably attached to the rear pivotable link in a manner that defines a pivot axis about which there can be relative pivoting between the rear pivotable link and the seat frame. The pivot axis mentioned in the immediately preceding sentence can be referred to as "the rear pivotable link's pivot axis". The height and/or inclination of the seat cushion is adjustable relative to the base by moving the pivotable links. With regard to the longitudinal seat direction, the rear pivotable link's pivot axis is positioned rearwardly of the backrest pivot axis in at least one position of adjustment of the seat cushion and/or of the backrest.

Because the rear pivotable link's pivot axis is positioned rearwardly the backrest pivot axis in the longitudinal seat direction, namely for at least one position of adjustment of the seat cushion and/or the backrest, the rear pivotable link can be very flatly oriented. As a result, the hip point is positioned very low as compared with known vehicle seats. In order to lower the height of the hip point, it is advantageous if the rear pivotable link's pivot axis is at the same time positioned rearwardly the rear end of the seat cushion in the longitudinal seat direction. The lowering of the hip point can be further improved by providing a lower crosspiece that supports the rear end of the seat cushion and is positioned lower than the other crosspieces that play a role in defining the seat frame. Lowering the hip point permits a more sporty design not only of the vehicle seat but also of the entire vehicle.

There are preferably various ways of adjusting the seat cushion (height and/or inclination), the backrest (inclination) or the entire vehicle seat (longitudinal seat position), each of which can be carried out singly or in any desired combination. Preferably, each adjustment is motor-driven, which is more comfortable. However, in each case it is also possible to provide a cheaper manual solution. In the case of the motor-driven variant, the generation of noise can be avoided by designing the respective motor-carrying element as a vibration absorber, for example by using composite fiber materials.

In order to be adaptable to various types of vehicle, the base and/or the seat frame are preferably designed to be variable in width, for example by providing the vehicle seat with a uniform structure on both sides of the seat, and by joining the two sides by way of cross connectors having optional means of attachment or optional dimensions, and the cross connectors may, if necessary, be cut to length as desired or they may be selected from a set of parts of different lengths.

Other aspects and advantages of the present invention will become apparent from the following.

BRIEF DESCRIPTION OF THE DRAWINGS

In the following, the invention is described in more detail on the basis of an exemplary embodiment depicted in the drawings, in which.

DETAILED DESCRIPTION OF EXEMPLARY EMBODIMENT

Figure 1:
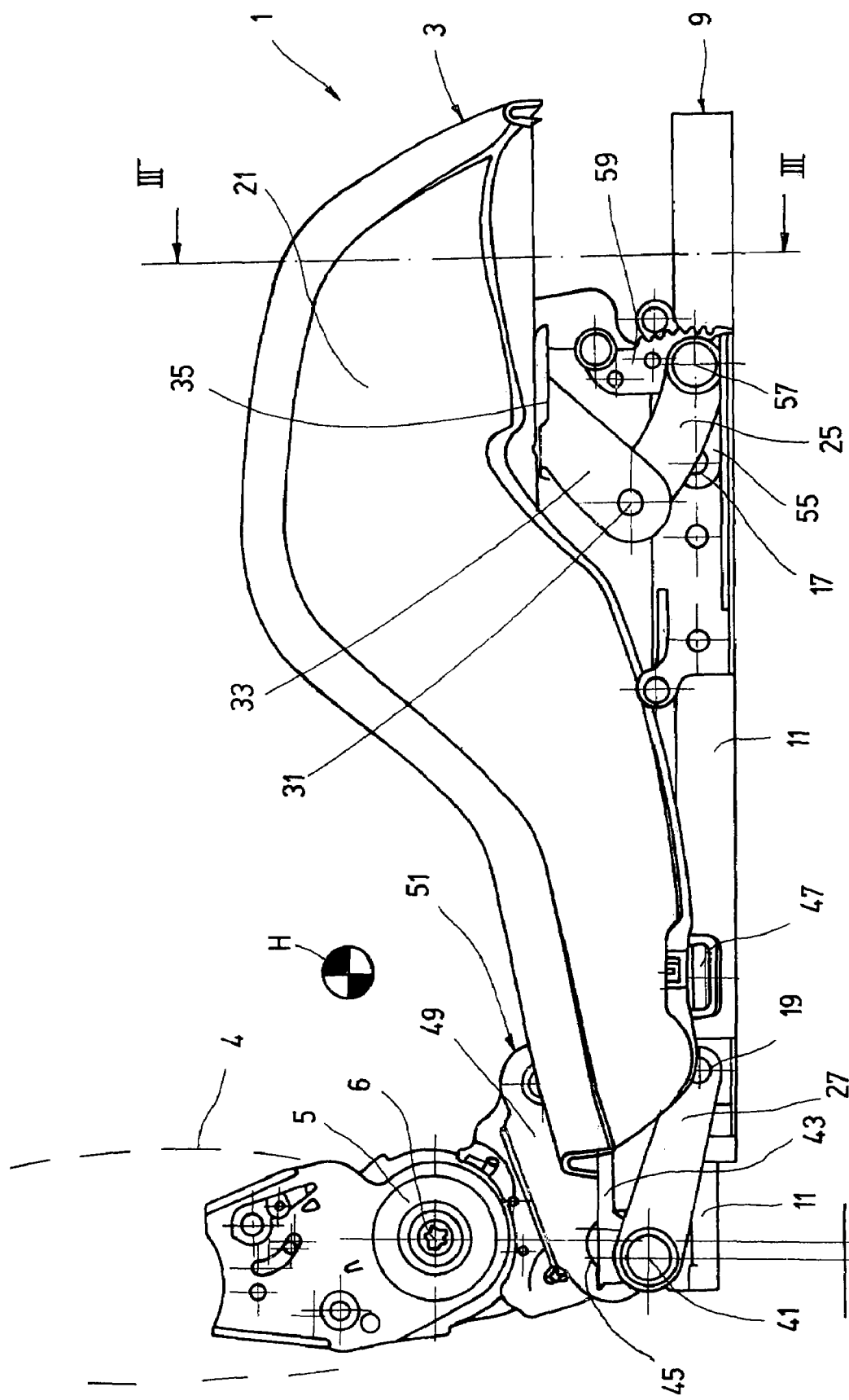
FIG. 1 is a longitudinal cross section through the exemplary embodiment along the line I-I in FIG. 3, with the backrest being schematically shown by dashed lines.
Figure 2:
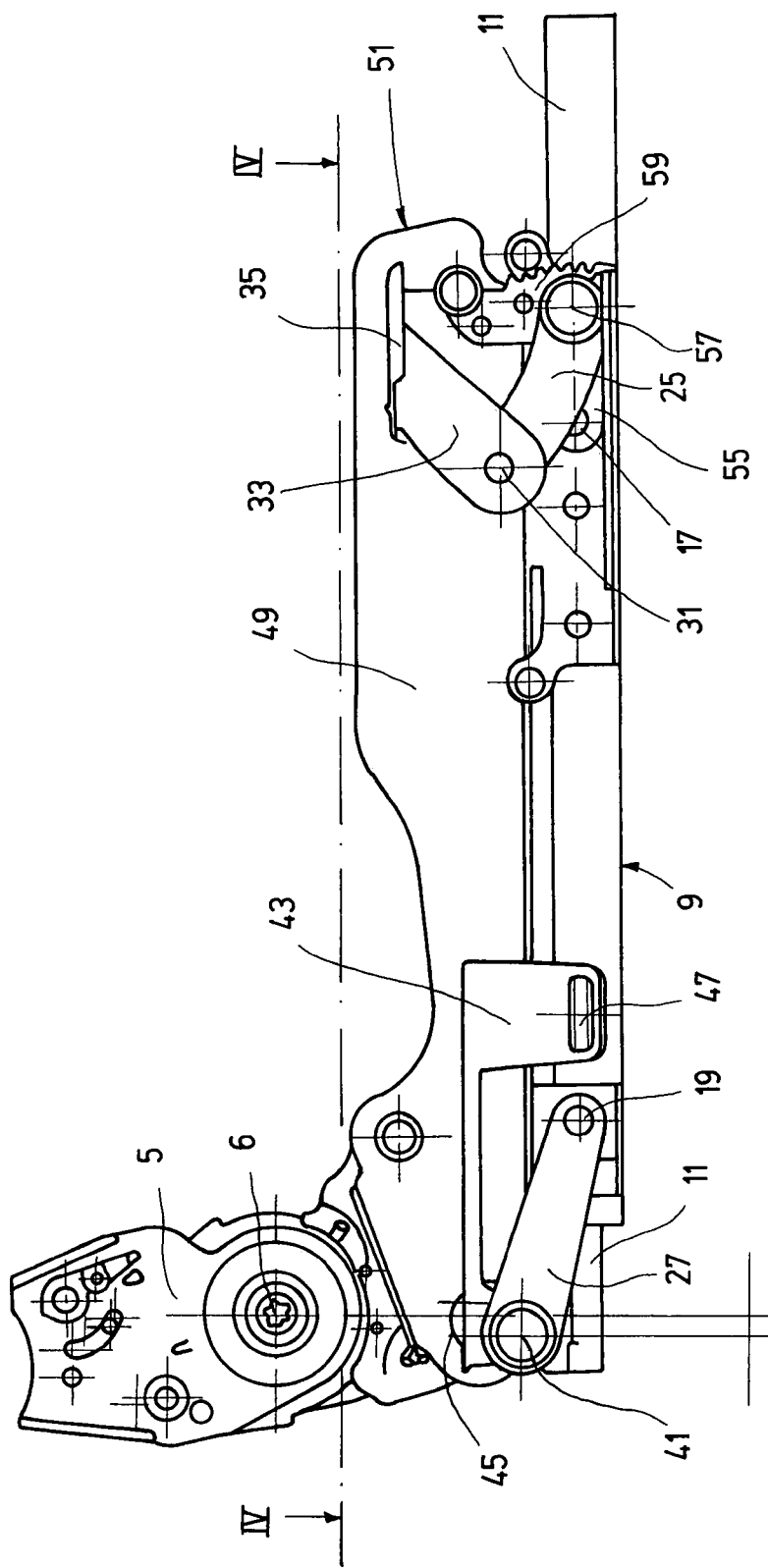
FIG. 2 is a section according to FIG. 1, without a seat cushion and without a backrest, with the section being along the line II-II in FIG. 4.

A vehicle seat designated by the numeral 1 is provided as a front seat in a motor vehicle. The vehicle seat 1 comprises a seat part 3 and a backrest 4. In the exemplary embodiment, the backrest 4 is mounted by way of fittings 5 on both sides of the seat part 3, and the backrest 4 can pivot about (e.g., can pivot partially around) a backrest pivot axis 6 relative to the seat part 3 (e.g., the backrest has positions of adjustment). In the exemplary embodiment, the inclination of the backrest 4 is adjustable (manually or by motor drive) and the backrest 4 is capable of pivoting freely. If the fittings 5 are geared fittings, in which two fitting parts execute a rotating motion with a superimposed wobbling motion relative to each other, the backrest pivot axis 6 is defined by the center of the upper fitting part, which in the exemplary embodiment is congruent with the pivot axis for the central free pivoting of the backrest 4.

The seat part 3 comprises a base 9 that is connected to the vehicle structure and extends in the direction of travel, thereby defining a longitudinal seat direction. In the exemplary embodiment, the base 9 comprises two pairs of seat rails 11 arranged parallel to each other. The seat rails 11 are slidingly movable relative to each other in a known manner for adjusting the longitudinal position of the vehicle seat 1 in the longitudinal seat direction. In the exemplary embodiment, the adjusting of the longitudinal position of the vehicle seat 1 in the longitudinal seat direction is by way of a longitudinal adjustment motor 13 arranged at the front of the base 9 (or between the seat rails 11). The seat part 3 also comprises a base plate 15 that joins together the respective upper (if upper and lower seat rails are present) or inner (if laterally mounted outer and inner seat rails are present) seat rails 11. The seat part 3 further comprises, on each side of the vehicle seat, a front bearing 17 and a rear bearing 19. In the exemplary embodiment, these bearings 17, 19 are designed as bolts and integrally formed on the base plate 15, including offsets thereof, or mounted on the base plate 15 or on the upper or inner seat rails 11. The dimensions or the attachments of the base plate 15 can be adapted to various spacings between the pairs of seat rails 11, i.e. the base plate 15 is variable in width. Instead of the base plate 15 it is also possible to provide two or more crosspieces between the pairs of seat rails 11.

Figures 3, 4:
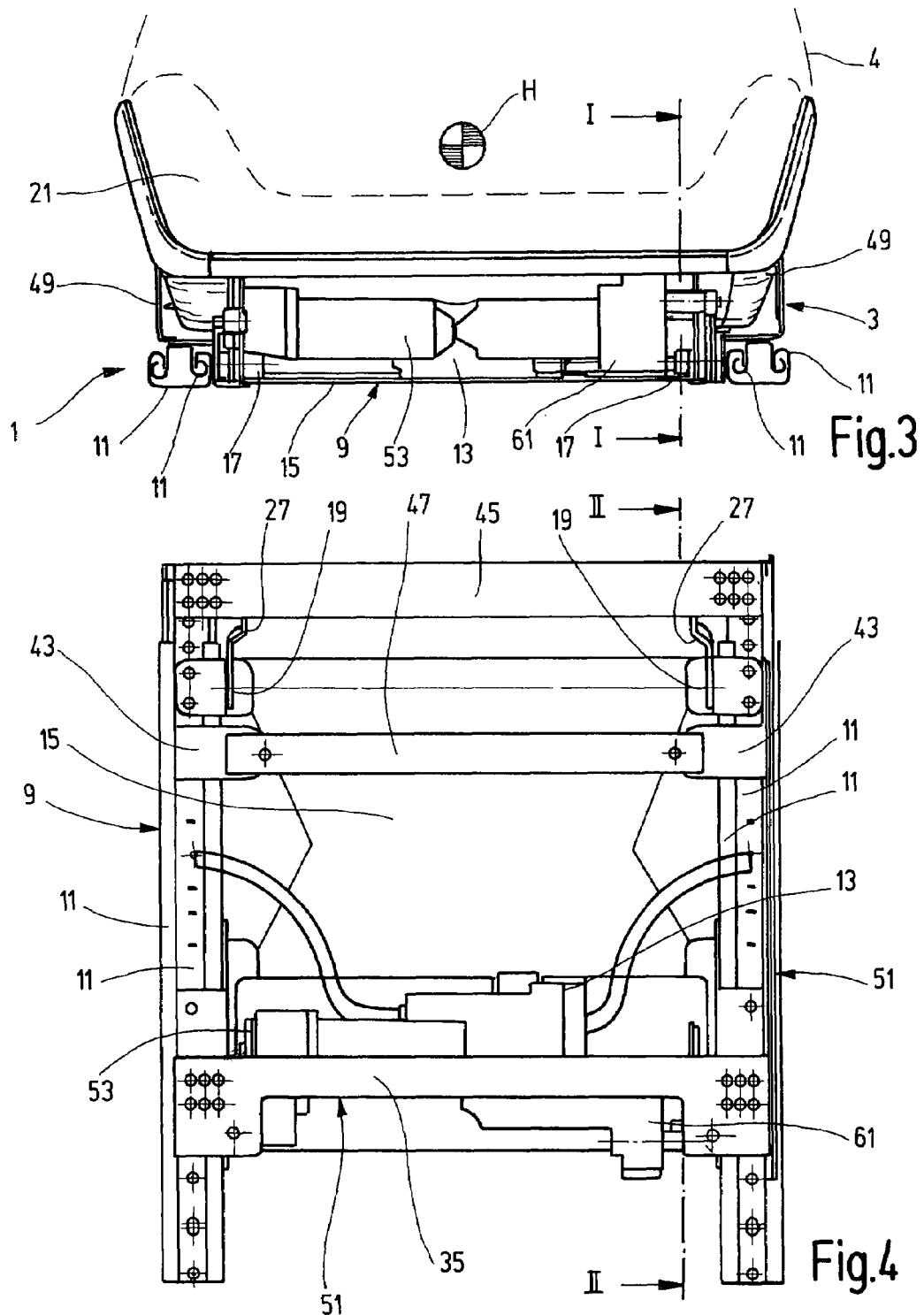
FIG. 3 is a cross section through the exemplary embodiment along the line III-III in FIG. 1, with the upholstery of the seat cushion and the backrest being merely indicated.
FIG. 4 is a horizontal section along the line IV-IV in FIG. 2.

The seat part 3 comprises a seat cushion 21 which, in the exemplary embodiment, comprises a seat shell made of metal or plastic and an upholstery part consisting of foam material covered with fabric or leather. The upholstery part of the seat cushion 21 is schematically illustrated by dashed lines in FIG. 3. The height of the seat cushion 21 can be adjusted relative to the base 9 (e.g., the seat cushion has positions of adjustment, and as the seat cushion moves between these positions of adjustment there is at least a change in height of the seat cushion with respect to the base). In order to adjust the height of the seat cushion 21 relative to the base 9, the seat part 3 comprises on each side of the vehicle seat 1 a front pivotable link 25 (e.g., rocker) and a rear pivotable link 27 (e.g., rocker). The front pivotable link 25 is pivotably attached to a mounting arm 33 by way of a pivot, so that the front pivotable link 25 pivots about (e.g., pivots partially around) a pivot axis 31 relative to the mounting arm 33. The mounting arm 33 is attached to or integrally formed on a front crosspiece 35 and projects obliquely downwards and to the rear in the exemplary embodiment. The dimensions or attachments of the front crosspiece 35, also those of the mounting arms 33, can be adapted to various spacings between the pairs of seat rails 11, i.e. they are variable in width.

An approximately U-shaped adapter 43 includes, with respect to the longitudinal seat direction, rear and forward arms. The rear pivotable link 27 is pivotably mounted on the rear arm of the adapter 43 by way of a pivot, so that the rear pivotable link 27 pivots about (e.g., pivots partially around) a pivot axis 41 relative to the adapter 43. The rear arm of the adapter 43 is connected by way of a rear crosspiece 45 to the rear arm of the adapter 43 on the other side of the vehicle seat 1. The forward arm of the adapter 43 is connected by way of a lower crosspiece 47 to the forward arm of the adapter 43 on the other side of the vehicle seat 1. The rear crosspiece 45 and the lower crosspiece 47 are arranged parallel to each other and also parallel to the front crosspiece 35, and their dimensions or attachments can be adapted to the different spacings between the pairs of seat rails 11, i.e. they are variable in width. The lower crosspiece 47 is arranged in the longitudinal seat direction between the front crosspiece 35 and the rear crosspiece 45. The lower crosspiece 47 is arranged lower (in the direction of the weight force) than an imaginary plane joining the front crosspiece 35 and the rear crosspiece 45. In the exemplary embodiment, the lower crosspiece 47 is arranged lower than each of the two other crosspieces 35, 45.

On each side of the vehicle seat, the adapter 43 and the front crosspiece 35 are rigidly connected at their face ends with a seat frame side part 49. The two seat frame side parts 49 and the crosspiece 35 and 45 (and 47) define a seat frame 51. In accordance with the exemplary embodiment, the seat frame 51 includes the adapters 43. The seat cushion 21 is supported on this seat frame 51 in that the seat cushion rests on the front crosspiece 35 and the lower crosspiece 47. The rear end of the seat cushion 21 is, in the longitudinal seat direction, arranged in front of the pivot axis 41 of the rear pivotable link 27. The fittings 5 are mounted in each case at the rear end of the seat frame side parts 49. In the exemplary embodiment and with respect to the longitudinal seat direction, the backrest pivot axis 6 is also arranged substantially in front of the pivot axis 41 of the rear pivotable link 27 at most positions of adjustment of the seat cushion 21 and of the backrest 4, and the backrest pivot axis 6 is to some extent arranged in front of the pivot axis 41 of the rear pivotable link 27 in at least some of the other positions of adjustment of the seat cushion 21 and the backrest 4. The arrangement chosen for the rear pivotable link's pivot axis 41 permits a flat, almost horizontal orientation of the rear pivotable link 27 and thus, like the selected arrangement of the middle crosspiece 47, also contributes to the fact that the hip point H is situated at a very low level compared with known vehicle seats.

The height of the seat cushion 21 is adjusted by providing, in the area of the pivot axis 31 of the front pivotable link 25, a drive (e.g., height adjustment motor 53) acting between one of the two front pivotable links 25, preferably between a toothed segment attached in a rotationally fixed manner to the selected front pivotable link 25, on the one hand, and the front crosspiece 35 forming part of the seat frame 51, on the other hand. The drive pivots the front pivotable link 25 and the front crosspiece 35 relative to each other, thus, because of the hinged linkage of the pivotable links 25 and 27 to the seat frame 51, i.e. forming a four-bar linkage (on each side of the vehicle seat), and because also of the selected orientation of the pivotable links 25 and 27, the drive raises and lowers the seat frame 51 and thus the seat cushion 21. The movement can be limited, for example, by providing stops. Preferably a motor drive is provided. In the exemplary embodiment, the motor drive that raises and lowers the seat frame 51, and thus the seat cushion 21, is a height adjustment motor 53 mounted on the front crosspiece 35 and having a worm element that engages in the toothed segment. However, it is also possible to provide a manual drive, for example with a stepping mechanism. The drive may also act between other links of the four-bar linkage.

In a four-way configuration, the front pivotable links 25 are pivotably attached to the front bearings 17 (or perhaps to bearings offset in the longitudinal direction thereto) and the rear pivotable links 27 are pivotably attached to the rear bearings 19, i.e. the base 9 is directly a link in the said four-bar linkage for adjusting the height of the seat cushion 21.

In the six-way configuration presented in this disclosure/in accordance with the exemplary embodiment, it is additionally possible to adjust the inclination of the seat cushion 21 (e.g., the seat cushion has positions of adjustment, and as the seat cushion moves between these positions of adjustment there is at least a change in inclination of the seat cushion with respect to the base 9). For this purpose, the rear pivotable links 27 are pivotably attached to the rear bearings 19. However, each of the front pivotable links 25 is pivotably attached at its front, lower end to the front end of a lower pivotable link 55, so that these two pivotable links 25 and 55 are pivotable relative to each other about (e.g., pivotable partially around) a pivot axis 57 of the lower pivotable link 55. In turn, the lower pivotable link 55 is pivotably attached at its rear end to the front bearing 17. As a result, the front pivotable link 25 is indirectly pivotably attached to the base 9. The arrangement of the base 9, seat frame 51 and pivotable links 25 and 55 is similar to that of a toggle lever.

For reasons of space, a drive (e.g., inclination adjustment motor 61) operates preferably on the side of the vehicle seat 1 opposite the drive (e.g., the height adjustment motor 53) for adjusting the height of the seat cushion 21. The drive for the inclination adjustment is between one of the two lower pivotable links 55 (preferably between a toothed segment 59 attached in a rotationally fixed manner to the selected lower pivotable link 55) and the base 9. The drive for the inclination adjustment causes relative pivoting between the pivotable links 25 and 55 and thereby a raising or lowering of the front end of the seat cushion 21, while the rear end of the seat cushion 21 is moved in the opposite direction because of the selected orientation of the pivotable links 27 and 55 and the coupling by way of the seat frame 51. Preferably a motor drive is provided. In the exemplary embodiment, the motor drive that adjusts the inclination is an inclination adjustment motor 61 that is attached to the base 9 and has a worm element engaging in the toothed segment 59. However, it is also possible to provide a manual drive, for example one having a stepping mechanism. The drive may also act between other links of the toggle lever arrangement. In principle, it would also be conceivable for the seat cushion 21 to be adjustable just in inclination but not in height.

It will be understood by those skilled in the art that while the present invention has been discussed above with reference primarily to an exemplary embodiment, various additions, modifications and changes can be made thereto without departing from the spirit and scope of the invention as set forth in the following claims.

That which is claimed:

1. A vehicle seat, comprising:
   a base that extends in a longitudinal seat direction;
   a seat cushion supported by a seat frame;
   a plurality of pivotable links configured so that the seat cushion has positions of adjustment, and the seat cushion moves between the positions of adjustment in response to movement of at least some of the plurality of pivotable links, wherein
   (a) movement of the seat cushion between the positions of adjustment comprises at least one of
      (1) a change in height of the seat cushion with respect to the base, and
      (2) a change in inclination of the seat cushion with respect to the base, and
   (b) the plurality of pivotable links comprises at least one front pivotable link and at least one rear pivotable link,
   (c) the front pivotable link is indirectly pivotably attached to the base,
   (d) the rear pivotable link is pivotably attached to the base,
   (e) the seat frame is pivotably attached to the front pivotable link, and
   (f) the seat frame is pivotably attached to the rear pivotable link in a manner that defines a first pivot axis about which there can be relative pivoting between the rear pivotable link and the seat frame; and
   a backrest mounted on the seat frame by way of at least one fitting, wherein the fitting defines a second pivot axis, and the backrest can be pivoted about the second pivot axis between positions of adjustment of the backrest, and with respect to the longitudinal seat direction, the first pivot axis is positioned rearwardly of the second pivot axis in at least one position of adjustment selected from the group consisting of
   (a) the positions of adjustment of the seat cushion, and
   (b) the positions of adjustment of the backrest.

2. The vehicle seat according to claim 1, wherein, with respect to the longitudinal seat direction:
   the seat cushion comprises a rear end; and
   the first pivot axis is positioned rearwardly of the rear end of the seat cushion.

3. The vehicle seat according to claim 2, wherein:
   the seat frame comprises two seat frame side parts, a front crosspiece, a rear crosspiece and a lower crosspiece;
   with respect to the longitudinal seat direction, the lower crosspiece is positioned between the front crosspiece and the rear crosspiece; and
   the seat cushion is supported on both the front crosspiece and the lower crosspiece.

4. The vehicle seat according to claim 2, wherein the plurality of pivotable links comprises a lower pivotable link, and the front pivotable link being indirectly pivotably attached to the base comprises:
   the front pivotable link being pivotably attached to the base by way of the lower pivotable link.

5. The vehicle seat according to claim 1, comprising a motor drive for causing movement of the seat cushion between at least some of the positions of adjustment of the seat cushion.

6. The vehicle seat according to claim 5, wherein the motor drive is proximate at least one of:
   a front part of the base, and
   a front part of the seat frame.

7. The vehicle seat according to claim 6, wherein the motor drive comprises a height adjustment motor for causing at least a change in height of the seat cushion with respect to the base.

8. The vehicle seat according to claim 7, comprising an inclination adjustment motor for causing at least a change in inclination of the seat cushion with respect to the base; wherein the inclination adjustment motor is proximate at least one of:
   a front part of the base, and
   a front part of the seat frame.

9. The vehicle seat according to claim 1, wherein:
   the rear pivotable link includes opposite first and second ends;
   the rear pivotable link being pivotably attached to the base comprises the first end of the rear pivotable link being pivotably attached to the base; and
   the seat frame being pivotably attached to the rear pivotable link comprises the seat frame being pivotably attached to the second end of the rear pivotable link.

10. The vehicle seat according to claim 1, wherein the base, the seat frame, or any combination thereof is variable in width.

11. The vehicle seat according to claim 1, wherein:
    the seat frame comprises two seat frame side parts, a front crosspiece, a rear crosspiece and a lower crosspiece;
    with respect to the longitudinal seat direction, the lower crosspiece is positioned between the front crosspiece and the rear crosspiece; and
    the seat cushion is supported on both the front crosspiece and the lower crosspiece.

12. The vehicle seat according to claim 11, wherein the lower crosspiece is arranged at a lower elevation than each of:
    the front crosspiece, and
    the rear crosspiece.

13. The vehicle seat according to claim 11, wherein the plurality of pivotable links comprises a lower pivotable link, and the front pivotable link being indirectly pivotably attached to the base comprises:

the front pivotable link being pivotably attached to the base by way of the lower pivotable link.

14. The vehicle seat according to claim 11, wherein the lower crosspiece is arranged at a lower elevation than an imaginary plane joining the front crosspiece and the rear crosspiece.

15. The vehicle seat according to claim 14, wherein the plurality of pivotable links comprises a lower pivotable link, and the front pivotable link being indirectly pivotably attached to the base comprises:

the front pivotable link being pivotably attached to the base by way of the lower pivotable link.

16. The vehicle seat according to claim 1, wherein the plurality of pivotable links comprises a lower pivotable link, and the front pivotable link being indirectly pivotably attached to the base comprises:

the front pivotable link being pivotably attached to the base by way of the lower pivotable link.

17. The vehicle seat according to claim 16, comprising a toggle lever arrangement, wherein the toggle lever arrangement comprises:

the front pivotable link being pivotably attached to the base by way of the lower pivotable link.

18. The vehicle seat according to claim 1, wherein the base comprises seat rails, and the seat rails are respectively slidable relative to one another in the longitudinal seat direction for moving the vehicle seat between longitudinal positions.

19. The vehicle seat according to claim 18, further comprising a longitudinal adjustment motor for causing movement of the vehicle seat between the longitudinal positions.

20. The vehicle seat according to claim 19, wherein the longitudinal adjustment motor is proximate a front part of the base.

* * * * *